(12) United States Patent
Kahl et al.

(10) Patent No.: US 10,324,821 B2
(45) Date of Patent: Jun. 18, 2019

(54) ORACLE CEMLI ANALYSIS TOOL

(71) Applicant: Oracle International Corporation, Redwood Shores, CA (US)

(72) Inventors: Shamus Kahl, Roswell, GA (US); Nathan Rooney, Liberty Township, OH (US); Stephen J. Wilson, Johns Creek, GA (US); Rahul Jain, Bangalore (IN); Saumyaranjan Acharya, Bhadrak (IN); Stephen Persky, Atlanta, GA (US); Ankit Kapil, Noida (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 99 days.

(21) Appl. No.: 14/835,433

(22) Filed: Aug. 25, 2015

(65) Prior Publication Data

US 2017/0060729 A1   Mar. 2, 2017

(51) Int. Cl.
*G06F 11/36* (2006.01)

(52) U.S. Cl.
CPC .............................. *G06F 11/3608* (2013.01)

(58) Field of Classification Search
CPC .................................................. G06F 11/3608
See application file for complete search history.

(56) References Cited

U.S. PATENT DOCUMENTS

| | | | |
|---|---|---|---|
| 6,367,077 B1 | 4/2002 | Brodersen | |
| 65,533,563 | 4/2003 | Ambrose | |
| 7,530,079 B2 | 5/2009 | Stubbs | |
| 8,122,377 B2 | 2/2012 | Jindal | |
| 8,549,490 B2 | 10/2013 | Dolby | |
| 8,788,542 B2 | 7/2014 | Barrow | |
| 8,898,627 B2 | 11/2014 | Gass | |

(Continued)

OTHER PUBLICATIONS

CAST Application Intelligence Platform for SAP; obtained at http://www.castsoftware.com/resources/document/brochures/thank-you/cast-for-sap; Copyright 2013; 6 pages.

(Continued)

*Primary Examiner* — Wei Y Zhen
*Assistant Examiner* — Amir Soltanzadeh
(74) *Attorney, Agent, or Firm* — Tarolli, Sundheim, Covell & Tummino LLP

(57) ABSTRACT

A system and method for facilitating characterizing customized computing objects of a software application, such as a networked enterprise application. An example method includes identifying one or more custom computing objects of one or more software applications of a computing environment; determining one or more grouping criteria for grouping identified custom objects; grouping information pertaining to the one or more custom objects based on the one or more grouping criteria, resulting in one or more custom object groupings; and using the one or more custom object groupings, with reference to data characterizing one or more changes slated to be made to the software application, to generate one or more user interface display screens. In a more specific embodiment, the data characterizing one or more changes includes metadata characterizing core software application maintenance events, upgrades, and/or other modifications.

20 Claims, 8 Drawing Sheets

(56) References Cited

U.S. PATENT DOCUMENTS

| | | | |
|---|---|---|---|
| 2006/0015863 A1* | 1/2006 | Vaidyanathan | G06F 9/4443 717/170 |
| 2009/0064090 A1 | 3/2009 | Anonsen | |
| 2010/0281458 A1* | 11/2010 | Paladino | G06F 8/71 717/106 |
| 2011/0119651 A1 | 5/2011 | Utschig-Utschig | |
| 2012/0179583 A1* | 7/2012 | Jensen | G06Q 30/0641 705/27.1 |
| 2014/0189644 A1* | 7/2014 | Mueller | G06F 9/44505 717/121 |
| 2014/0366002 A1* | 12/2014 | Jentsch | G06F 8/71 717/122 |

OTHER PUBLICATIONS

CAST Application Intelligence Platform for SAP—Measure Control and Improve Quality of Business Applications; obtained at http://www.castsoftware.com/products/application-intelligence-platform; downloaded circa Mar. 9, 2015; 2 pages.

Application Benchmarching; obtained at http://www.castsoftware.com/glossary/application-benchmarking; downloaded circa Mar. 9, 2015; 2 pages.

IFPUG CAST Software; obtained at http://www.castsoftware.com/glossary/ifpug; downloaded circa Mar. 9, 2015; 2 pages.

CAST Field Ops; obtained at http://www.galorath.com/images/uploads/2-2011-12-08_technical_debt-geert_jan_waanders.pdf; downloaded circa Mar. 9, 2015; 19 pages.

Application Quality Benchmarking Repository Analyzer; obtained at http://www.castsoftware.com/products/appmarq; downloaded circa Mar. 9, 2015; 1 page.

IBM—InfoSphere Optim Application Repository Analyzer; obtained at http://www-03.ibm.com/software/products/sv/infooptiap-plrepoanal; downloaded circa Mar. 9, 2015; 1 page.

AdvOSS Upgrade Process; obtained at http://www.advoss.com/resources/policies/AdvOSSUpgradeProcess.pdf; downloaded circa Mar. 9, 2015; 2 pages.

* cited by examiner

Impacts Summary / Cust. Grp. Impacts ▼ ~182

~180

~184

Cust. Grp. Impacts ~186

| Cust. Grp. Name | Not Impacted ▲ | Impacted | Obsolete |
|---|---|---|---|
| Credit Interface 1 | 45 | 82 | 15 |
| Time Entry Mod 1 | 33 | 218 | 8 |
| Cust. Workflow 1 | 32 | 41 | 0 |
| Cust. Interface 1 | 25 | 58 | 0 |

ORACLE CEMLI ANALYSIS TOOL

BACKGROUND

The present application relates to computing and more specifically to software and accompanying systems and methods for collecting and using information pertaining to software customizations made to a core software application.

Software for tracking, monitoring, or analyzing software customizations are employed in various demanding applications, including software debugging tools used with integrated development environments; software integration testing, and so on. Such applications often demand user friendly informative tools for providing insight about customized software, including insight about interactions and compatibility with other software components and insight helping to reduce deployed customizations.

Informative customization analysis tools are particularly important in complex multi-tier enterprise computing environments, which may include hundreds of servers running different distributed applications with thousands of custom components. Cloud services customers who customize delivered enterprise software applications may benefit by understanding the impacts that certain software customizations have on the overall enterprise computing environment. Such information can be important when deciding whether to keep or modify customizations when core software is upgraded or changed.

Conventional customization tracking tools often ineffectively track effects of customizations in complex multi-language, multi-tier networked enterprise computing environments. Accordingly, such tools may output stale data that does not account for recent core application upgrades, patches, and fixes.

Conventionally, before generating impact reports associated with software customizations, customers must complete the enterprise software upgrade process. Hence, enterprise cloud services customers must often download and install the latest enterprise software; then search for, find, and apply the latest fixes. Customers must then inspect potentially thousands of custom components to determine which components are functioning properly, and so on. If the upgrade is problematic, e.g., interferes with critical customizations, then costly rollback of the upgrade may be required.

In general, excessive upgrade costs may deincentivize core software application upgrades. Lack of insight as to how an upgrade or maintenance event will impact existing customizations may further inhibit customer adoption of new core software application features that could replace certain legacy customizations. As numbers of legacy customizations accumulate, software maintenance becomes progressively costly. Furthermore, customers may overlook newly deliverable features, functionality and software products and/or services.

SUMMARY

An example method facilitates characterizing customized computing objects of a software application, such as a networked enterprise application. The example method includes identifying one or more custom computing objects of one or more software applications of a computing environment; determining one or more grouping criteria for grouping identified custom objects; grouping information pertaining to the one or more custom objects based on the one or more grouping criteria, resulting in one or more custom object groupings; and using the one or more custom object groupings, with reference to data characterizing one or more changes slated to be made to the software application, to generate one or more User Interface (UI) display screens.

In a more specific embodiment, the data characterizing one or more changes includes data maintained in a maintenance event repository and/or upgrade event repository. The environment includes an enterprise computing environment, and the one or more software applications include one or more Enterprise Resource Planning (ERP) software applications.

The UI display screen includes, illustrates, or otherwise provides access to a report indicating a degree of customization of a customized core software application relative to the degree of customization of one or more other customer implementations of the software application. The report may include a UI control that is responsive to user interaction to trigger display of information resulting from a comparison of one or more customizations with a feature of the software application slated to be part of a future upgrade or modification of the software application.

The example method may further include receiving a signal responsive to user interaction with a first UI control, the signal indicating user-specified characteristics used to define a particular custom object grouping. The user-specified characteristics may include, for example, information specifying that a particular custom object grouping pertains to payroll processing, employee benefits, regulatory compliance issues, etc.

In the specific embodiment, the example method further includes proactively monitoring, in real time, changes to be made to the core software application with reference to the customized computing objects and custom object groupings, and generating a signal to alert a customer of the software application when a change to the software application is estimated to impact behavior of one or more of the customized computing objects. The signal may be implemented via an email message indicating one or more impacted customized objects that will be impacted by a change slated for the core software application. The email message may include the report.

The example method may further include generating periodic comparisons between metadata characterizing a first customer software application; information characterizing ongoing maintenance of the software application by a vendor of the software application; and information characterizing currently available upgrades of the software application. The metadata may include information specifying one or more custom object groupings that are grouped in accordance with one or more business requirements and that characterize one or more customizations made to the first customer software application.

An accompanying UI display screen may include one or more UI controls for viewing information pertaining to results of the comparisons. Customer decisions related to the results may be recorded or stored for future reference. Feedback pertaining to various customer customizations of a vendor-supplied software application or suite thereof may then enable software vendors and associated developers to adjust future modifications, e.g., upgrades to the software applications, thereby potentially reducing the need for customers to customize the software applications. This may reduce costs for both customers and vendors of enterprise software applications.

Hence, certain embodiments discussed herein provide tools for discovering, e.g., documenting and characterizing, custom or customized components (e.g., custom computing objects, also called customizations herein) of a core software application, and then using the discovered information to facilitate forecasting future impacts of the customizations on applications running in the computing environment.

By facilitating finding and comparing software customizations, certain embodiments help to enable users to anticipate results of customizations; analyze impacts of applying maintenance events or upgrades to the core software application long before a maintenance project or upgrade is applied and without requiring implementation of a core software application upgrade or other change. This helps customers of the core software application to make informed software-related decisions, e.g., to plan for and schedule changes to the customer enterprise computing environment.

By enabling customer-defined grouping of customizations, e.g., grouping of custom objects according to technical business requirements, products, business processes, and so on, large quantities of technical data (potentially relating to many thousands of custom objects) may be arranged into fewer more manageable and meaningful groups of customizations. Customization groups may be characterized by metadata (i.e., data about data) describing functional information associated with different groups of custom objects (also called Customization, Extension, Modification, Localization, Interface (CEMLI) Identifications (IDs)).

Use of the object grouping mechanisms may enable customers of a vender-supplied networked enterprise software application to make more informed and impactful decisions regarding their customizations. This may help to reduce numbers of unnecessary customizations and lower software upgrade costs and post-upgrade cost of software ownership.

Through use of custom object groupings and proactive and ongoing core software application monitoring and impact reporting, customers can now readily make informed cost-saving decisions pertaining to software customization, upgrade, and maintenance.

Enterprise customers now have efficient mechanisms and methods to analyze customizations; to understand how new software releases, maintenance updates, or other patches will impact their customizations and associated computing environment; to make informed decisions that may reduce use of potentially costly and maintenance-intensive customizations, and so on.

A further understanding of the nature and the advantages of particular embodiments disclosed herein may be realized by reference of the remaining portions of the specification and the attached drawings.

BRIEF DESCRIPTION OF THE DRAWINGS

FIG. 5 illustrates a first example user interface display screen with user interface controls and features enabling user creation of custom object groups, viewing of information pertaining to custom objects and object groups, and so on.

FIG. 6 is illustrates a second example user interface display screen showing additional information pertaining to custom objects and custom object groups and whether the objects and groups will be impacted by a particular core software maintenance event, patch, or upgrade.

DETAILED DESCRIPTION OF EMBODIMENTS

Figure 1:
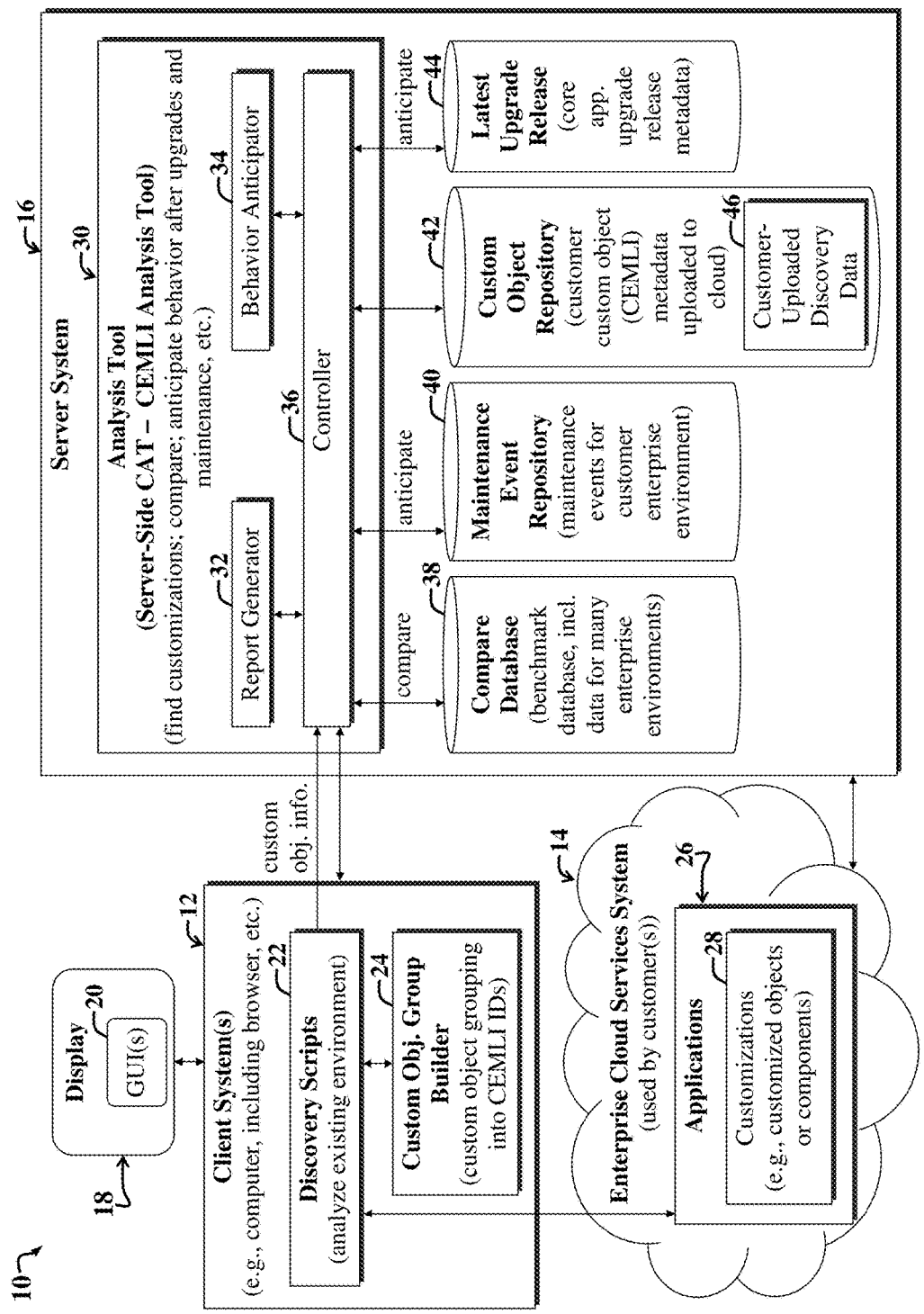
FIG. 1 is a block diagram illustrating a first example system and accompanying enterprise computing environment configured to detect and analyze custom software components with reference to benchmark data and data pertaining to slated maintenance events and upgrades of core application software.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for an enterprise. An enterprise may be any organization of persons, such as a business, university, government, military, and so on. The terms "organization" and "enterprise" are employed interchangeably herein.

An example enterprise computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include web services managers, service buses, E-business suites, process managers, notification servers, domain administration software, various types of middleware, including Application Programming Interfaces (APIs), and so on.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) domain.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices, such as the smart device behavior analysis and control system 128, via the Internet.

Note that conventionally, certain enterprise software customers (e.g., enterprises using the enterprise software) may subscribe to and access enterprise software (e.g., Enterprise Resource Planning (ERP) software) by subscribing to a particular suite of cloud services offered via the enterprise software. Various components of the enterprise software may be distributed across resources (e.g., servers) of a network. Note that enterprise software provided by a vendor (e.g., a core enterprise software application) may be deployed to or hosted by a customer cloud, a vendor cloud, and/or a third party cloud, and so on. Such clouds may include one or more servers, which may be included in one or more data centers. In general, embodiments discussed herein are not limited by a particular deployment location (e.g., data center location) or ownership of a deployment location. Deployment location may be implementation specific and may vary depending upon the needs of a customer, vendor, and/or third party participant and their available computing resources, etc.

Software development tools, i.e., toolsets, for modifying the supplied enterprise software may be delivered with the enterprise software and associated services. This facilitates customer initiated customizations, modifications, or replacements of certain components of the delivered enterprise software, called the core software application (or simply core software) herein. Large enterprises may make thousands of customizations to a delivered core software application or application suite.

Accordingly, analyzing customizations and ensuring that no critical or undesirable conflicts arise when applying a new patch or upgrading the core applications, can be particularly important, but also costly and time consuming. Certain embodiments discussed herein facilitate custom object analysis and enable informed decisions pertaining to future upgrades, maintenance events, and used customizations, as discussed more fully below.

The custom components, also simply called customizations or custom objects herein, may interact with core software. The core software may be maintained, patched, upgraded, or otherwise modified along with various components. A given modification to the software, e.g., as may occur during an upgrade, can affect, i.e., impact, the functioning of components and the core system, and vice versa. An impacted custom component can be one which, for example, is rendered inaccurate, non-functional, irrelevant, inefficient, redundant; or may otherwise be undesirable to include in its present form in the core software after the core software has been changed.

Enterprises that maintain customized software that is integrated with a core system may aim to detect defects and/or errors in computer code; lower software maintenance costs; and have the ability to compare their customized computing environments with other implementations and customizations. Generally, system level analysis may be required to identify architecturally complex code violations and structural code flaws involving interactions among components that reside in different application layers and that may cause business disruptions.

Historically, enterprise software customers often defer decision making due to complexities and uncertainties involved in upgrading or modifying core software that is integrated or otherwise works with thousands of customizations. Accordingly, customers may be slow in migrating to an upgraded version and may be slow in deciding to replace customizations with a newly available vender supplied feature accompanying an upgrade release. This can increase overall system complexity and application operation expense, as potentially conflicting outdated customizations accumulate. These phenomena can also reduce the likelihood that a customer will purchase new product or otherwise leverage newly available features and functionality afforded by the new software product or upgraded version of a currently used software product or service. Certain embodiments discussed herein aim to address these issues.

Customizations often add cost and complexity to enterprise software upgrade projects and burden ongoing enterprise application support and maintenance. Effective customization tracking and analysis tools are needed to effectively reduce such costs and complexities and to enable enterprise customers to make informed decisions pertaining to software customizations and core software upgrades.

For clarity, certain well-known components, such as hard drives, processors, operating systems, power supplies, Internet Service Providers (ISPs), class loaders, bytecode compilers, and so on, are not necessarily explicitly called out in the figures. However, those skilled in the art with access to the present teachings will know which components to implement and how to implement them to meet the needs of a given implementation.

FIG. 1 is a block diagram illustrating a first example system 10 and accompanying enterprise computing environment configured to detect and analyze custom software components 28 (also called custom objects or simply customizations herein) with reference to benchmark data and data pertaining to slated maintenance events and upgrades of core application software. The example system 10 includes one or more client systems 12 in communication with a software change analysis server system 16 and one or more enterprise applications (e.g., ERP software applications) 26 accessible via an enterprise cloud services system 14 (also simply called a cloud herein).

For the purposes of the present discussion, an object may be may be any grouping of or encapsulation of data and/or functionality. Examples of objects include classes or structures implemented via object-oriented programming languages; tables, rows, or records of a database; and so on. Similarly, a database may be any collection of one or more objects. Accordingly, if one or more objects are represented via a file (e.g., a text file, eXtensible Markup Language (XML) file, JavaScript Object Notation (JSON) file, etc.) the file may be called a database for the purposes of the present discussion.

Note that, in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, the server system 16 may optionally be shown as part of the enterprise cloud services system 14. Note that the enterprise cloud services system 14 may be implemented via a customer cloud, a vender cloud, and/or a third party cloud, such that the core software application (e.g., as represented via the applications 26) and accompanying customizations 28 are deployed to customer, vendor, and/or third party data centers used to implement the cloud service system 14. Commonly, the applications 26 and accompanying customizations 28 are deployed to (hosted by) a customer's own data center. Accordingly, the analysis tool 30 can be used to analyze customizations that have been deployed in a cloud of the service provider (e.g., vender of the core software application), third party, and/or customer. Note that in certain implementations, the customizations to a core software application may be deployed to a different data center than that used to host the core software application.

The example system 10 includes the one or more client systems 12, which may be operated by a customer of a suite of enterprise applications 26 that are accessible to the client system(s) 12 (e.g., operated by an enterprise customer) via the enterprise cloud services system 14 that may be hosted by an enterprise software vendor. The enterprise applications 26 may include software development tools for enabling customers to modify components, e.g., computing objects, of the applications 26; create new components; remove components, and so on, of the core applications 26.

For the purposes of the present discussion, the terms "customized component," "custom component," and "customization" are employed interchangeable to refer to any computing object or other software function, procedure, routine, or collection thereof that has been created or modified by a customer of the core applications 26. A core application may be any software application that is supplied by (or made accessible to a customer via) a vendor to the customer.

Customizations are often either Conversions, Extensions, Modifications, Localizations, or Interfaces (CEMLI). Accordingly, a customization is sometimes called a CEMLI. Metadata defining a group of particular CEMLIs is sometimes called a CEMLI Identification (CEMLI ID).

In the present specific embodiment, the client system(s) 12 run discovery scripts 12 to analyze the enterprise software applications 26 to identify customizations 28, including custom objects. The discovery scripts 22 may include or communicate with Graphical User Interface (GUI) that includes rendering instructions for rendering User Interface (UI) controls and data as part of a GUI 20 presented via a client-side display 18.

The GUI 20 includes features, e.g., UI controls, enabling user control over the running of the discovery scripts 22. The discovery scripts 22 include computer code for compiling metadata describing or otherwise characterizing and naming the detected customizations 28 included in or in communication with the applications 26. For the purposes of the present discussion, a discovery script may be any collection of computer code configured to enable retrieval of information pertaining to one or more aspects of (e.g., numbers and types of customizations characterizing) a computing environment.

The client system(s) 12 also run a custom object group builder 24 that communicates with or is otherwise incorporated in the discovery scripts 22. The custom object group builder 24 includes computer code that facilitates user (e.g., customer) specification of grouping criteria for grouping metadata for individual customizations 28 detected via the discovery scripts 22 into groups of metadata, where the groups represent or identify groups of customizations, as discussed more fully below.

Note that in certain implementations, the custom object group builder 24 is implemented server side, e.g., via software running on the server system 16. In such implementations, customers may employ the client system(s) 12 to browse to a Uniform Resource Locator (URL) or Uniform Resource Identifier (URI) identifying a network address for the custom object group builder application.

For the purposes of the present discussion, customization grouping criteria may be any information usable to categorize one or more customizations and/or metadata associated therewith or otherwise usable to distinguish between groups of computing objects or components. The grouping criteria may reflect technical requirements, e.g., requirements that certain customizations be grouped with or associated with a particular business process, software application, legal or regulatory compliance issue (e.g., tax category pertaining to updates for payroll systems; financial aid systems for higher education students, etc.), and so on. The information may include data indicating which process, which product, etc., a custom object and/or group of custom objects pertains.

A customization object grouping may be a group of customized objects or a group of metadata pertaining to the customized objects. The metadata may include, for example, names of customization objects, names of customization object groups, descriptions of previous upgrade or maintenance decisions applicable to a custom object or group of custom objects, and so on.

Information (e.g., metadata) characterizing customizations (e.g., custom objects) and groups of customizations is forwarded to an analysis tool 30 running on the customization analysis server system 16. The information may be included in discovery or files 46, which may be stored in a server-side custom object repository 42.

Note that the client systems 12 may include additional local storage for maintaining copies of the customer discovery data 46. The custom object repository 42 may include discovery data obtained from other customers to be used for comparison purposes and generation of relative complexity metrics or scores, as discussed more fully below.

The customer discovery data 46 may include additional custom object metadata, without departing from the scope of the present teachings. For example, historical data indicating past customer decisions pertaining to a given customization may also be maintained via the custom object repository 42 or other database accessible to the analysis tool 30.

The example server-side Customization Analysis Tool (CAT) 30 includes a controller 36 that interfaces and coordinates communications between and input from various databases 38-44, a report generator 32, and a behavior anticipator 34. The controller 36 also includes computer code for handling customization metadata from the client-side discovery scripts 22 and delivering it to the custom object repository 42 for subsequent use by the report generator 32 and behavior anticipator 34.

The behavior anticipator 34 includes computer code for analyzing and monitoring the customer-uploaded discovery data 46 with reference to the installed customer applications 26, any slated maintenance events or patches (information about which is maintained in the maintenance event repository 40), any slated upgrades (information about which is maintained in the latest upgrade release database 44), and for generating a signal or alert when a maintenance event or upgrade release is slated to impact or otherwise affect the behavior of one or more of the customizations 28 and/or groups thereof.

The signal or alert may be forwarded electronically (e.g., via email) to the client systems 12 and/or customer thereof. The signal or alert may also form part of a report produced by the report generator 32, which may also be forwarded to the client system(s) 12 via email.

The report generator 32 includes computer code for periodically generating various types of reports when a new maintenance event, upgrade event, or other modification to the core applications 26 is slated or otherwise available for installation, and when any changes to the customizations 28 may impact the currently installed applications 26. Reports generated by the report generator 32 may be accessible to the client systems 12, e.g., via a browser in communication with the server system 16 via a network, such as the Internet.

Various types of reports and associated content are possible. For example, customer accessible reports may include data and graphics illustrating benchmark scores for different categories of enterprise software customers; tables and graphics indicating numbers of customizations broken down by predetermined object categories (e.g., business logic, data structures, interfaces, reports, security, web services, workflows, etc.), including percentile values ranking the number of customizations relative to other customer customizations; numbers of customizations broken down by customer specified customization groupings (CEMLI IDs), applicable software product, upgrade decision, description, complexity score, etc.; graphics indicating reductions in customizations or a given time interval, and so on, as discussed more fully below.

The reports generated via the report generator 32 may also include various UI controls, which are accessible via UI display screens represented via one or more of the GUIs 20 depicted on the client-side display 18. The UI controls may include controls for specifying customization groupings, also called custom object groupings or CEMLI IDs; controls for sorting displayed data and associated metrics; controls for viewing and/or registering customer decisions related to particular customizations and/or groups of customizations, and so on.

For the purposes of the present discussion, a UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen (also simply called screen herein) may refer to all application windows presently displayed on a display.

A UI control may be any displayed element or component of a UI display screen, which is adapted to enable a user to provide input, view data, and/or otherwise interact with a UI.

Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

Benchmarking data displayed via the reports is accessible to the report generator 32 via the compare database 38. The compare database 38 includes benchmarking data characterizing many different computing environments.

Similarly, data, i.e., metadata, describing slated maintenance events and historical maintenance events is accessible to the report generator 32 (for incorporation into reports) via the maintenance event repository 40. Data pertaining to customer supplied customizations and groupings is accessible to the report generator 32 via the custom object repository 42. Similarly, metadata characterizing a slated upgrade release and/or historical upgrade releases for the core applications 26 is accessible to the report generator 32 via a latest upgrade release database 44.

Figure 2:
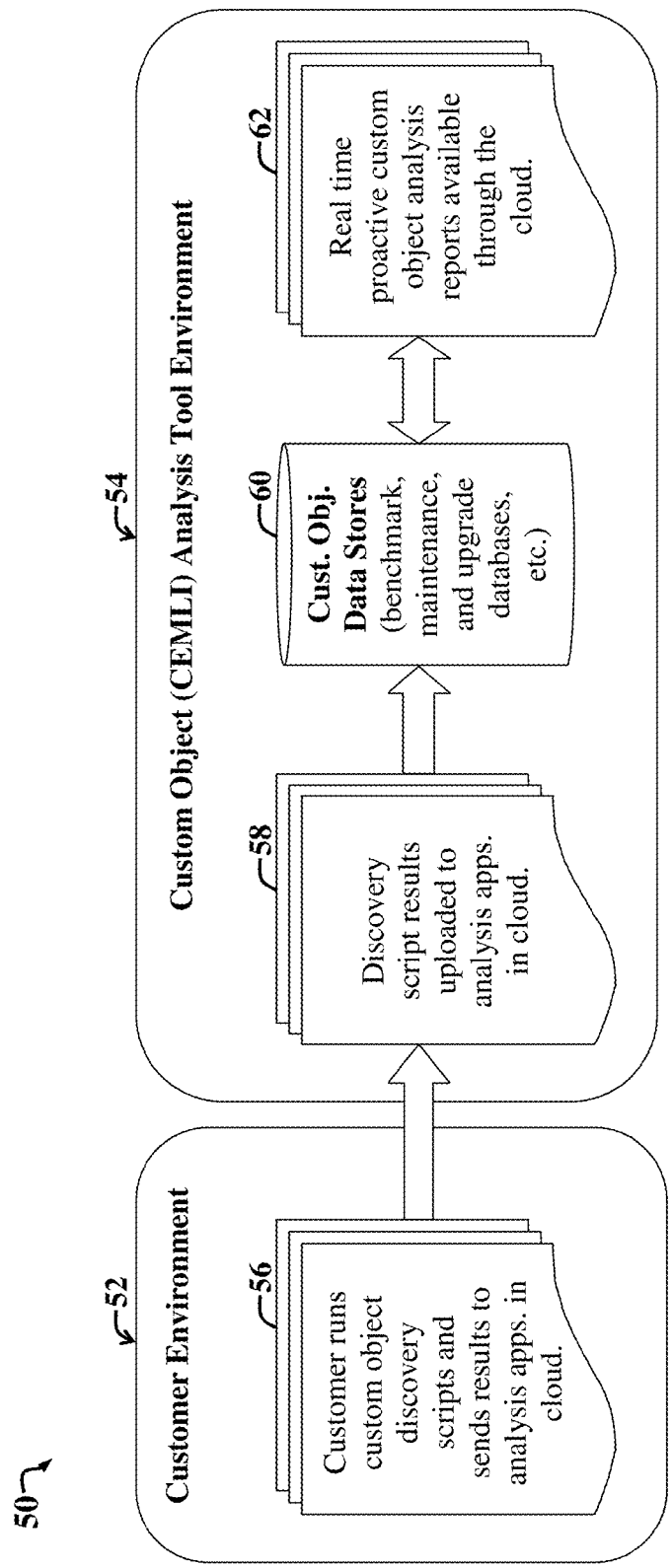
FIG. 2 is a first example process flow diagram applicable to the system of FIG. 1.

FIG. 2 is a first example process flow diagram illustrating an example process 50 suitable for use with the system 10 of FIG. 1. The process 50 includes steps 56-62 implemented via a customer enterprise computing environment 52 (also simply called customer environment) and a custom object analysis tool computing environment 54 (also simply called the CEMLI Analysis Tool (CAT) environment).

With reference to FIGS. 1 and 2, the customer environment may include the client system(s) 12 and cloud-based applications 26 and accompanying customizations 28. The CAT environment 54 may include the customization analysis server system 16 and any associated modules or web services running on or leveraging the enterprise cloud services system 14.

In the customer environment 52, the process 50 includes execution of a customization discovery step 56. The customization discovery step 56 includes execution of the discovery scripts 22 and/or custom object group builder 24 of FIG. 1, resulting in discovery of some or all of the customizations 28. The discovered information includes metadata pertaining to and identifying each discovered customization 28.

The metadata pertaining to the discovered customizations is then further grouped into categories or buckets that have been defined via user interaction with the custom object group builder 24 of FIG. 1. Note that in certain implementations, the custom object group builder 24 may include predefined grouping criteria, such that metadata pertaining to discovered customizations are automatically grouped according to the predefined or default grouping criteria.

Customization discovery data, including metadata describing customizations and groups thereof is then delivered to the CAT environment 54 of FIG. 2 in an uploading step 58.

The uploaded data is then used, in a benchmarking step 60, for benchmarking against data uploaded by different customer environments. The benchmarking may result in generation of relative complexity scores, customization count percentages, and other comparison results indicating relative rankings of the customer supplied customization data with corresponding customization supplied by other customers or users (e.g., enterprises) of networked enterprise applications.

Subsequently, a proactive reporting step 62 involves periodically, or in real time, accessing the custom object data stores 60 to generate analysis reports characterizing customizations indicated by customization metadata uploaded in the uploading step 58. The reports may be interactive and may include various UI controls for accessing different metrics, complexity scores, numbers of customizations that will be impacted by a particular core software maintenance event, patch, upgrade, or other change. The reports may include features for enabling users to drill down into data, e.g., to illustrate exactly how or why a particular customization will be impacted by a particular change in the core application software.

In summary, insights gained by utilizing the custom object analysis and benchmarking reports via a custom object analysis tool (e.g., to analysis tool 30 of FIG. 1), help customers to make more informed and impactful decisions pertaining to removal and use of customizations during upgrade or maintenance projects and pertaining to custom object retrofitting and testing activities.

Certain embodiments discussed herein provide features that enable a customer to measure or estimate how complex their application is (including customizations) compared to other customers; to see estimated impacts from future upgrade events before an upgrade event is initiated; to see estimated impacts from future maintenance before applying the maintenance, and so on.

Figure 3:
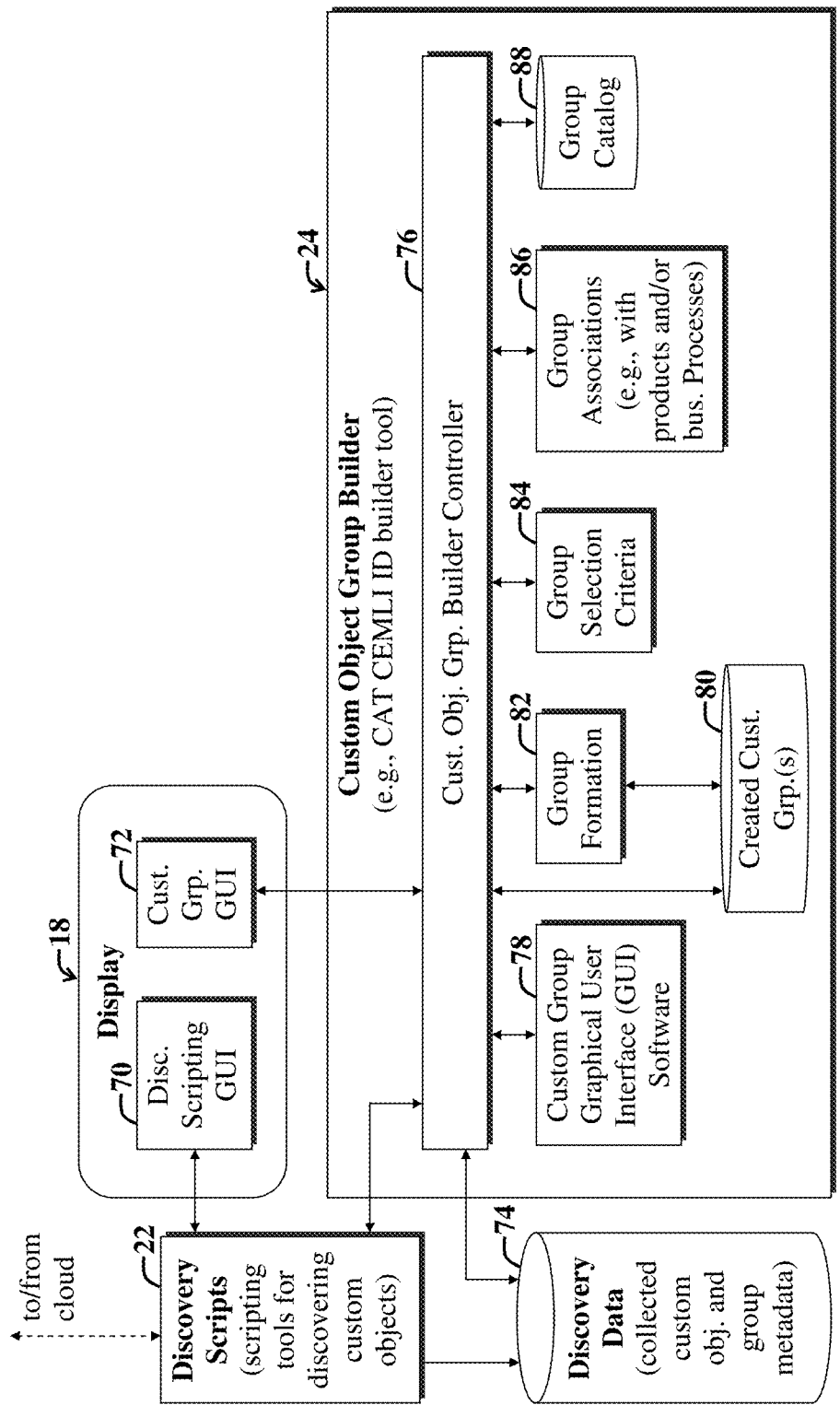
FIG. 3 is a block diagram illustrating more detail of a custom object group builder that may be incorporated into the system of FIG. 1.

FIG. 3 is a block diagram illustrating more detail of an example custom object group builder 24, which may be employed to implement the custom object group builder 24 of the system of FIG. 1.

The custom object group builder 24 may communicate with the discovery scripts 22 to obtain customization discovery data 74. Alternatively, or in addition, the custom object group builder 24 independently accesses the discovery data 74.

The discovery data 74 may represent locally stored data, i.e., data that is stored on the client system(s) 12. The discovery data 74 may be subsequently forwarded to the custom object repository 42 of FIG. 1 and stored server-side as customer-uploaded customization discovery data 46 of FIG. 1. Alternatively, or in addition, a copy of the discovery data 74 is accessible to the custom object group builder 24 via the server-side custom object repository 42.

The example custom object group builder 54 (also called a CAT CEMLI ID builder tool) includes a controller 76, which includes computer code for coordinating interactions and communications between various modules 72, 78, 80, 82, 84, 86, 88 and for generating rendering instructions for a custom group GUI 72, which may be presented on the display 18.

A discovery scripting GUI 70 provides UI controls and features enabling customers to launch processes that act to discover customizations and populate the discovery data 74. Exact details of the discovery scripting GUI 70 and the custom group GUI 72 are implementation specific and may vary depending upon the needs of a given implementation. The custom object controller 76 communicates with custom group GUI software 78, which includes computer code for generating rendering instructions for the custom group GUI 72.

A group selection criteria module 84 maintains metadata defining rules or criteria for allocation of different custom objects (e.g., customizations) to a particular group. The group selection criteria 84 may be user defined and/or may include default criteria. The criteria may specify, for example, that customizations that match a payroll processing criteria be grouped in a payroll processing custom object group (CEMLI ID). Note that in certain alternative embodiments, UI controls may be provided in the custom group GUI 72 to enable users to manually specify that particular customizations are to be grouped with a particular custom object group.

Group selection criteria 84 and manual user assignment of custom objects to custom object groups define a set of group associations 86. The group associations may specify, for example, that certain custom object groups are associated with particular products, business processes, tax compliance subjects, and so on. Exact groupings are implementation specific and may vary.

A group formation module 82 may account for manually assigned customizations to groups, as well as customizations that are automatically assigned to groups (via the group formation module) 82 in accordance with specified group selection criteria 84. Different groupings of custom objects (as represented via groups of metadata characterizing and identifying the custom objects), as defined by the group associations 86, may be stored in a custom group database 80. Data in the custom group database 80 may be formatted for inclusion in a custom group catalog 88.

The custom group catalog 88 may catalog user defined custom object groups and predefined object groups, which may be browsed via the custom group GUI 72. Note that various modules 78-88 and associated data and/or functionality may be user accessible via the custom group GUI 72 and associated GUI software 78 and controller 76.

Note that the various modules 78-88 of the example custom object group builder 24 may be grouped differently than shown, without departing from the scope of the present teachings. For example, the created custom group database 80 and the group catalog 88 may be integrated into a single module. Furthermore, the group formation module 82, group selection criteria, and group associations module 86 may be integrated in a single software module.

In addition, some of the modules 78-88 may be implemented server-side, e.g., on the server system 16 of FIG. 1, as opposed to client-side on the client system(s) 12 of FIG. 1. For example, the group catalog 88 may be maintained at the CAT tool 30 custom object repository 42 and/or compare database 38 of FIG. 1.

In summary, the custom object group builder tool 24 facilitates inventorying and cataloging potentially thousands of custom objects and grouping the custom objects into customization groups, also called CEMLI IDs. Through use of CEMLI IDs as discussed herein, customers, e.g., enterprises, may make more impactful upgrade project decisions that may enable significant reductions in custom objects, as customers can now more clearly understand what software products and business processes are customized, and can now more readily and accurately prioritize their decisions pertaining to whether to keep or delete certain customizations. Overall reductions in customizations through use of embodiments discussed herein may reduce software maintenance, upgrade, and customer service costs.

Figure 4:
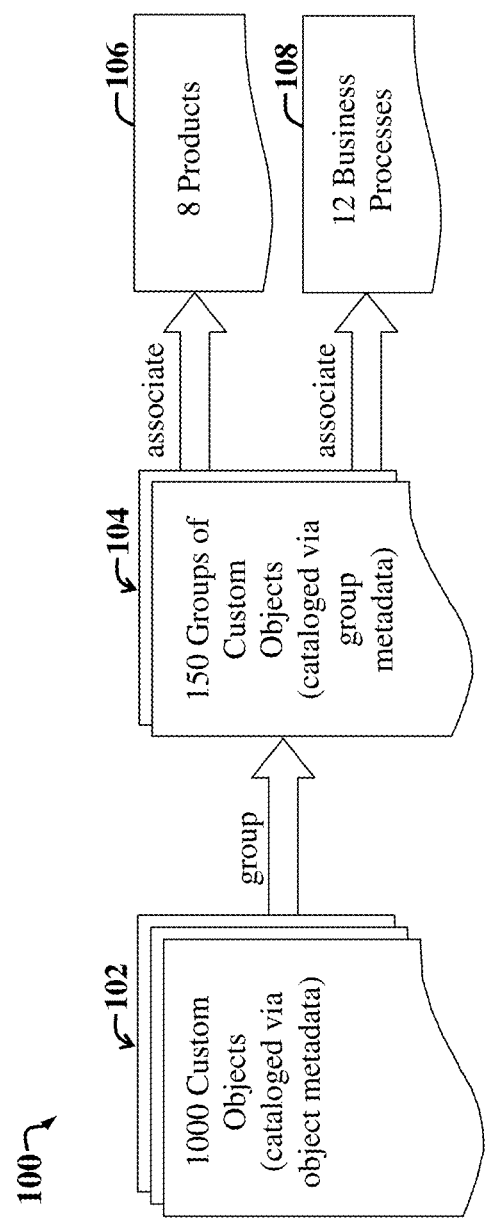
FIG. 4 is a second example process flow diagram illustrating an example grouping process that may be implemented via the custom object group builder of FIG. 1, and which involves grouping of custom objects and association of resulting groups with software products and/or business processes.

FIG. 4 is a second example process flow diagram illustrating an example grouping process 100 that may be implemented via the custom object group builder 24 of FIGS. 1 and 2, and which involves grouping of custom objects and association of resulting groups with software products and/or business processes.

A first process step 102 includes inventorying or discovering many (e.g., 1000) custom objects, i.e., customizations by collecting associated custom object metadata.

A second process step 104 includes grouping the many discovered custom objects into a smaller number of groups (e.g., 150 groups) of customizations. The groups of customizations may be characterized by customization metadata identifying criteria for inclusion in the group and/or otherwise naming and/or characterizing the groups. The groups may also incorporate metadata characterizing each custom object included in the group.

In subsequent parallel process steps 106, 108, the different customization groups are associated with different products 106, different business processes 108, and/or other macro groupings or associations.

Accordingly, customizations, e.g., custom objects, may be hierarchically grouped. Customization grouping is not limited to the formation of a signal grouping for a particular set of customizations, but may further include groupings of groupings, and so on, thereby forming a hierarchy of groups or dimensions. The exact numbers of groupings and associations of groupings with other groupings, e.g., numbers of levels in grouping hierarchies, are implementation specific and may vary, without departing from the scope of the present teachings.

A vender of the core enterprise application software, including the custom object analysis tool 30 of FIG. 1, may periodically or continually compare each custom object repository 42 for each customer against the latest upgrade release for the core software application and against the latest maintenance releases for the core software application. Online impact reports and associated dashboards and UI display screens may be updated in real time as such comparisons are completed.

A given custom object group, e.g., CEMLI ID, may include custom pages, records, fields, event records, and so on. Use of such CEMLI IDs as discussed herein facilitate cataloging large numbers of custom objects into fewer buckets, i.e., groups. When buckets are created, then subsequent reporting performed by the analysis tool 30 of FIG. 1 can be performed for both individual custom objects and CEMLI IDs, i.e., groups of custom objects.

Use of the CEMLI IDs may enhance the meaningfulness of data in a report, e.g., instead of a report merely flagging a particular line of code, the report may indicate, for example, that a certain group of customizations will affect an enterprise hiring process after a core application upgrade, as the associated CEMLI ID has been determined to be impacted by a slated upgrade process.

Accordingly, use of CEMLI IDs as discussed herein may simplify enterprise decision making and may provide new ways for enabling customers to view their computing environments and associated functionality. Accordingly, enterprise personnel, e.g., Chief Information Officers (CIOs), who may or may not have technical backgrounds, may now readily understand why a decision is made pertaining to a customization or upgrade from a business and technology perspective.

Figure 5:
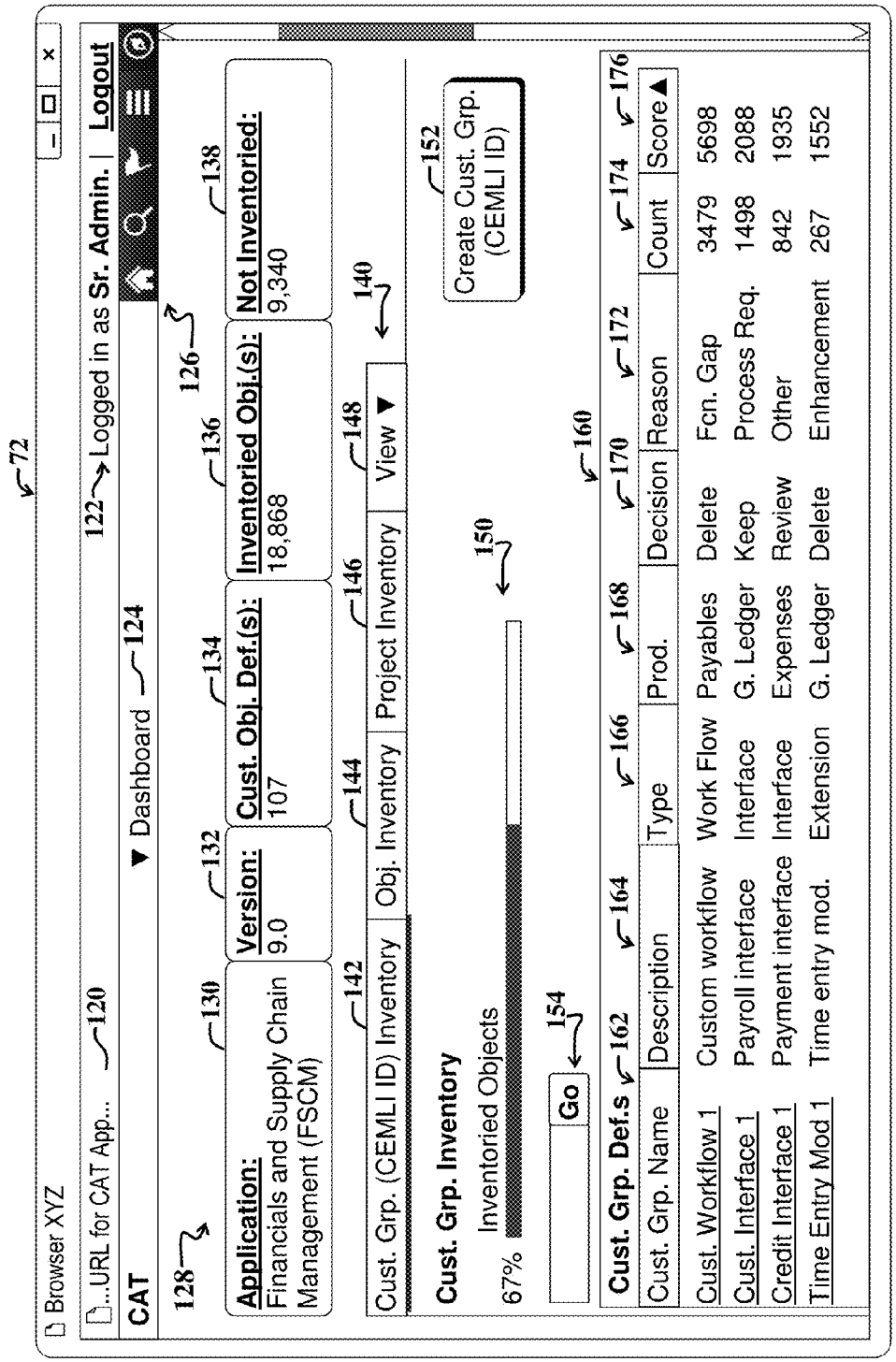

FIG. 5 illustrates a first example UI display screen 72 with UI controls and features enabling user creation of custom object groups, viewing of information pertaining to custom objects and object groups, and so on.

The UI display screen 72 may be implemented via one or more of the GUIs 20 of FIG. 1 and/or custom group GUI 72 of FIG. 3. The example UI display screen 72 may be implemented via browser, where a Uniform Resource Locator (URL) 120 for the CEMLI Analysis Tool (CAT) 30 of FIG. 1 has been entered in an address bar.

An example user (e.g., enterprise customer senior administrator) has logged into the interface, as indicated via login indicia 122 and has navigated to a custom object report dashboard of an associated CEMLI Analysis Tool (CAT), e.g., via a first navigation control 124. Various additional navigation, search, and settings controls 126 are also provided.

The CAT dashboard UI display screen 72 includes various header controls 128, which may include hyperlinked indicators, including a core application indicator 130, an application version indicator 132, a custom object definition indicator 134, an inventoried object indicator 136, and a non-inventoried object indicator 138. The various indicators may be user selected, resulting in a drill down, i.e., display of additional information associated with each indicator 130-138. For example, user selection of the custom object definition indicator 134 may trigger display showing more detail for different custom object definitions.

In the present example embodiment, the core application indicator 130 indicates that the vendor supplied software application, i.e., core software application, which was supplied by a vendor and then modified by the customer (e.g., by adding custom objects, and/or modifying preexisting application objects), is a Financials and Supply Chain Management (FSCM) networked enterprise computing application.

The version indicator 132 indicates that the core software application is version 9.0. The custom object definitions indicator 134 indicates that 107 custom object definitions (i.e., customization groups, also called CEMLI IDs) have been created. The inventoried objects indicator 136 indicates that 18,868 custom objects were inventoried and categorized in accordance with the custom object definitions. The not inventoried objects indicator 138 indicates that 9,340 custom objects were not categorized into one or more customization groups indicated via the custom object definition indicator 134.

The dashboard screen 72 further illustrates a set of tabs 140, including a custom group inventory tab 142, a custom object inventory tab 144, a project inventory tab 146, and a view tab 148. The view tab 148 may act as a UI control for enabling user access to additional and/or different tabs.

Currently, the custom group inventory tab 142 is selected, and the contents thereof are displayed in the dashboard screen 72. The contents of the custom group inventory tab 142 include a group inventory indicator 150, which indicates a percentage of total custom objects that have been inventoried, i.e., allocated to particular custom object groups (i.e., CEMLI IDs). Currently, 67% of the custom objects characterizing the customer's modified FSCM Version 9.0 application have been inventoried.

A grouping button 152 for creating additional custom object groups 152 represents a user option to trigger display of an additional UI display screen with data and UI controls for enabling user specification of and/or definition of or modification of custom object groups. The specifications and definitions of custom object groups may include grouping criteria, rules, manual association of custom objects with particular groups, and so on.

Note that in certain implementations, user selection of the grouping button 152 may leverage functionality provided via the client-side custom object group builder 24 of FIG. 1, and/or custom object group builder functionality running on the CAT tool 30 of the server system 16. Accordingly, in certain embodiments, the custom object group builder 24 of FIG. 1 may be implemented server-side and/or client-side, without departing from the scope of the present teachings.

A search control 154 represents a user option to trigger a search for a particular custom object or custom object group. A scrollable and sortable listing 160 of custom object groups and associated data is shown beneath the search control 154.

The listing 160 is implemented as a table of custom object group definitions, also called customization groups or CEMLI IDs and includes various columns 162-176 of data for each custom object group indicated in a first group name column 162. Examples of custom group names include "custom workflow 1," "custom interface 1," and so on. Note that custom groups are themselves may be categorized, e.g., as representing customized interfaces, extensions, localizations, modifications, and so on.

A description column 164 indicates descriptions associated with each entry in the custom group name column 162. Data illustrated in the table or listing 160 via the various columns 162-178 represents metadata characterizing custom objects and custom object groupings.

A type column 166 indicates a type of customization group for each customization group named in the custom group name column 162. Products associated with each of the custom groups of the custom group name column 162 are indicated in a product column 168. The product column 168 indicates one or more application components or sub-applications for the vendor supplied core enterprise software application, e.g., the FSCM application indicated via the application indicator 130.

Customer decisions pertaining to each named group 162 are illustrated in a decision column. A reason column 172 indicates a reason for each decision indicated in the decision column 170. A count column 174 indicates a count of the number of custom objects included in each named group 162. Similarly, a sortable score column 176 lists complexity scores, which represent metrics characterizing a measurement of complexity for each named custom group 162. Exact mechanisms for calculating the complexity scores 176 are implementation specific and may vary, without departing from the scope of the present teachings.

FIG. 6 is illustrates a second example UI display screen 180 showing additional information pertaining to custom objects and custom object groups and whether the objects and groups will be impacted by a particular core software maintenance event, patch, or upgrade. The second example UI display screen 180 may be accessible via the first UI display screen 72 of FIG. 5, e.g., in response to user selection of a custom group impacts tab accessible via the view tab 148 of the second UI display screen 72 of FIG. 5.

A first indicator control 182 indicates that an accompanying group impacts table 184 has been selected for display. The first indicator control 182 may act as a drop-down menu control, whereby other user options for displaying additional reports are user accessible.

The example custom groups impacts table 184 illustrates, for each group identified in a group name column 186, how many custom objects are impacted (in a sortable not-impacted column 188) for a particular maintenance event or upgrade; how many custom objects of the corresponding named group 186 may be impacted (in an impacted column 190); and numbers of custom objects that are obsolete or otherwise not being used (as indicated in an obsolete column 192).

Note that various items shown in the tables 186-192 may be hyperlinked or otherwise configured to enable user selection thereof so as to trigger drill down, i.e., display of additional information or more details pertaining to each listed item. For example, user selection of "15" from the obsolete column 192 may trigger display of additional detail characterizing each obsolete custom object, thereby enabling customers to proceed with discarding customizations or otherwise making informed decisions about how to address the 15 obsolete customizations associated with the credit interface 1 custom object group shown in the custom group name column 186.

Furthermore, headers of the various columns 186-192 may act as UI controls enabling functions such as sorting, e.g., as shown via a sort-control 194, which also acts as a header to the not-impacted column 188.

Figure 7:
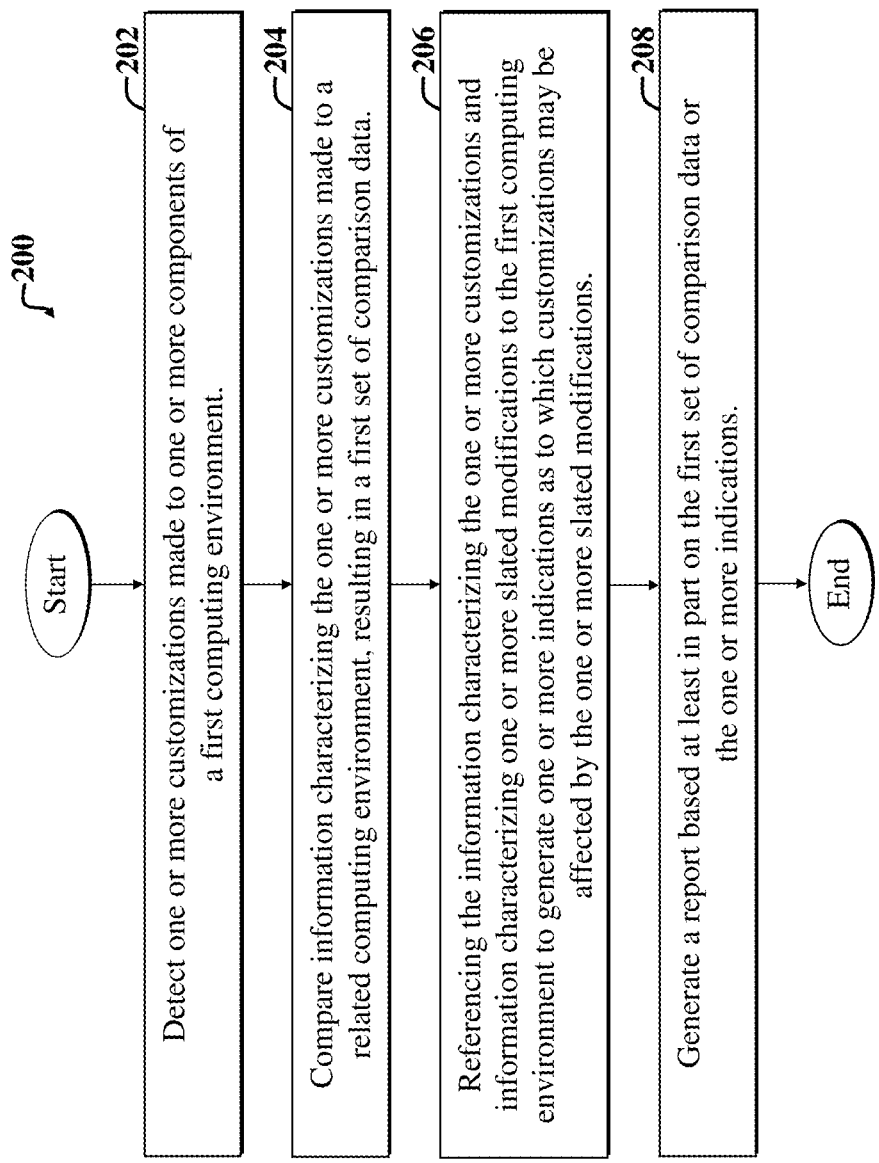
FIG. 7 is a flow diagram of a first example method suitable for use with the embodiments of FIGS. 1-6.

FIG. 7 is a flow diagram of a first example method 200 suitable for use with the embodiments of FIGS. 1-6. The example method 200 facilitates analysis of operation of components of a computing environment, e.g., of an enterprise software application and custom components (i.e., customizations, also called custom objects) thereof.

The example method 200 includes an initial customization detecting step 202, which involves detecting one or more customizations made to one or more components of a first computing environment.

A subsequent comparing step 204 includes comparing information characterizing the one or more customizations made to a related computing environment, resulting in a first set of comparison data. The first set of comparison data may represent a type of benchmarking data, which may include calculations of ranks of complexity of a given customer computing environment relative to other customers, etc.

Next, an information referencing step 206 includes referencing the first set of comparison data (i.e., the information characterizing the one or more customizations) and information characterizing one or more slated modifications to the first computing environment to generate one or more indications as to which customizations may be affected by the one or more slated modifications. The indications may indicate, for example, which custom objects and/or custom object groups may be impacted by a particular maintenance event, upgrade, or other change to a vender-supplied core software application, if the maintenance event, upgrade, and/or other change is applied to the customer's enterprise computing environment.

A subsequent report generating step 208 includes generating a report based at least in part on the first set of comparison data or the one or more indications. The report may be presented via one or more UI display screens, e.g., the UI display screens 74, 180 of FIGS. 5 and 6.

Note that the method 200 may be altered or augmented, without departing from the scope of the present teachings. For example, the method 200 may be augmented to further specify that the one or more related computing environments include several enterprise software application computing environments, e.g., various instances of PeopleSoft, JD Edwards, and/or other enterprise computing environments.

The example method 200 may further include monitoring one or more proposed future maintenance events to be applied to the computing environment. The one or more customizations represent one or more customizations made to one or more customized computing objects. Computing environment includes an enterprise computing environment.

The example method 200 may further include using one or more discovery scripts to perform the step of detecting 202 via analysis of the first computing environment; generating one or more files that contain information about custom objects existing in one or more applications of the computing environment; and processing the one or more discovery files via an analysis tool and a report-generation tool, e.g., the CAT tool 30 of FIG. 1.

The example method 200 may further include using the analysis tool to measure complexity of a customized software application relative to the complexity of one or more other software applications used by different customers, and using the analysis tool to generate one or more indications of projected impacts on one or more customized software applications caused by implementation of a modification to the software application. The modification to the software application may include an upgrade of one or more core components of the software application; a patch or maintenance event to be applied to one or more core components of the software application, and so on.

The example method 200 may further include providing a mechanism (e.g., GUI and accompanying UI controls and data) to enable user viewing of a description of one or more projected impacts to result from one or more modifications made to the software application by a vendor of the software application. The mechanism may include software for generating an online impact report that is updated in real time as new vendor-implemented modifications are slated for the software application.

The example method 200 may further include selectively grouping information about custom objects into groups of custom objects. The groups of custom objects (also called customization groups) may represent logical groups, e.g., groups associated with a particular application component, business process, and so on. The formation of custom groups represents a transformation of metadata associated with a custom object into metadata indicating a customization group to which the custom object is assigned.

The example method 200 may further include using the logical groups to display data in a report, the data indicating whether a customization object or logical group of customization objects will be impacted by a vendor-supplied maintenance event or upgrade event slated to be applied to the software application.

The example method 200 may further include using a customization group building tool to provide one or more UI controls responsive to user interaction therewith catalog customization groups. Each customization group may represent an object with one or more sub-objects, wherein the one or more sub-objects of an object meet one or more criteria for a particular group. The criteria may include one or more functional or technical requirements.

The example method 200 may further include providing one or more UI controls (e.g., via one or more of the GUIs 20 of FIG. 1) to enable a user to upload metadata characterizing a customization to a cloud storage mechanism; and monitoring the storage mechanism with reference to metadata pertaining to a most recent version of the vendor-supplied software application and to a most recent maintenance event; and generating a flag when a potential conflict between a custom object and the software application is detected. The flag may represent a signal, e.g., an email message, sent in response to detection of a detected potential conflict or impact of a customization with a core software application or component thereof.

Figure 8:
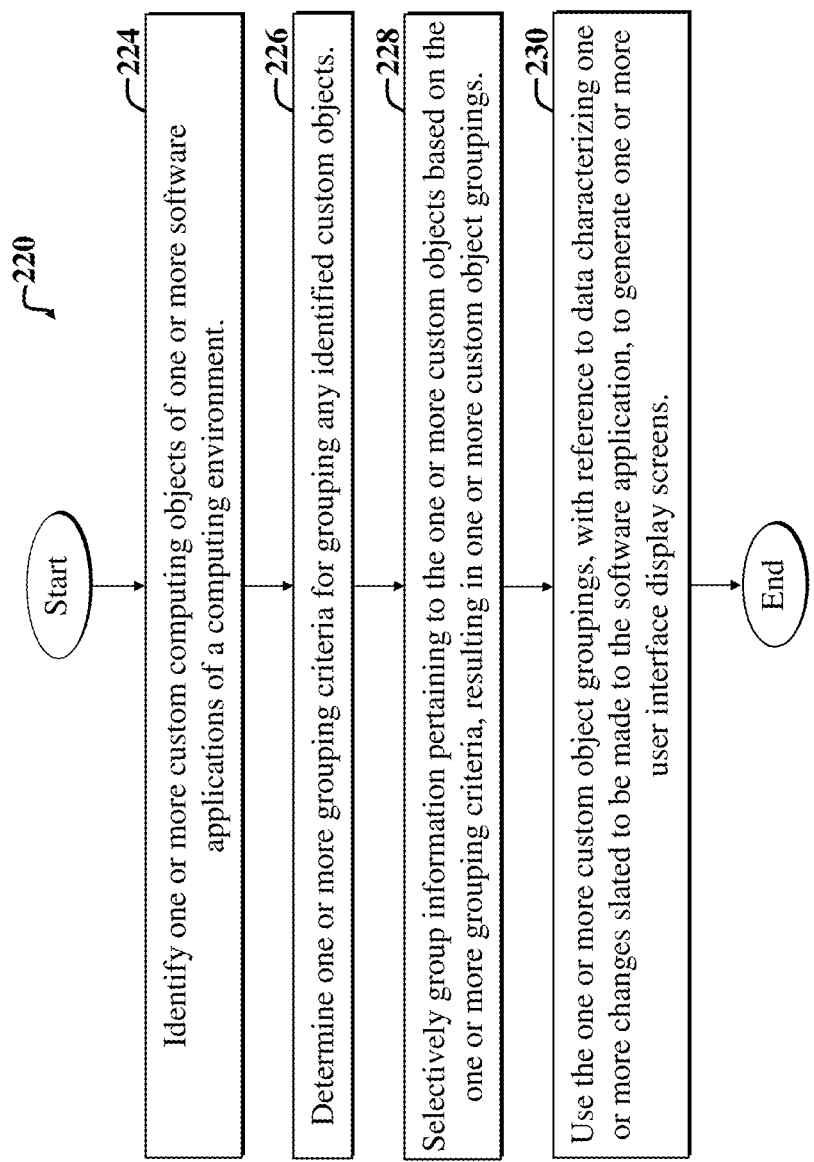
FIG. 8 is a flow diagram of a second example method suitable for use with the embodiments of FIGS. 1-6.

FIG. 8 is a flow diagram of a second example method 220 suitable for use with the embodiments of FIGS. 1-6. The second example method 220 characterizes customized computing objects, e.g., customizations, of a software application, also called a core software application.

The second example method 220 includes a first step 224, which involves identifying one or more customized computing objects of one or more software applications of a computing environment, resulting in identified one or more custom objects.

A second step 226 includes determining one or more grouping criteria for grouping the identified one or more custom objects.

A third step 228 includes selectively grouping information pertaining to the one or more custom objects based on the one or more grouping criteria, resulting in one or more custom object groupings.

A fourth step 230 includes using the one or more custom object groupings with reference to data characterizing one or more changes slated to be made to the software application to generate one or more UI display screens.

Note that the method 220 may be altered, without departing form the scope of the present teachings. For example, the method 220 may be further augmented to specify that the data characterizing one or more changes includes data maintained in a maintenance event repository and/or an upgrade event repository.

For the purposes of the present discussion, a maintenance event repository may be any collection of data, e.g., database, characterizing or describing historical (i.e., previously applied) and/or slated (i.e., scheduled to be applied in the future) software and/or other changes to computing resources characterizing one or more core enterprise software applications and/or computing environments, where the changes (i.e., maintenance events) are such that they do not require redeployment of the one or more enterprise software applications, and where the changes represent vendor-initiated modifications made to the one or more enterprise software applications delivery. Examples of maintenance event modifications include modifications to adjust application performance, correct faults, install patches, and/or to adjust other software attributes.

A core software application may be any collection of one or more intercommunicating software applications or modules that are supplied by one or more vendors to a customer. A vender may be any entity or collection of entities that act as purveyors of software. An upgrade event repository may be any collection of data characterizing past and/or future deliveries of a core software application.

The second example method 220 may be further augmented to specify that the one or more software applications include one or more enterprise software applications, and that the computing environment includes an enterprise computing environment.

The UI display screen may include or incorporate a report indicating a degree of customization of the software application relative to the degree of customization of one or more other customer implementations of the software application. The degree of customization indication may include a metric or score that estimates the degree of customization. The metric may indicate a degree of customization relative to customizations implemented by other customers using similar or different platforms.

The second example method 220 may further include providing, in the report, a UI control that is responsive to user interaction therewith to trigger display of information characterizing results of a comparison of one or more customizations with a feature of the software application slated to be part of a future upgrade of the software application.

The second step 226 may further include receiving a signal responsive to user interaction with a first UI control, the signal indicating user-specified characteristics for a particular custom object grouping. For example, the user-specified characteristics may include information specifying that a particular custom object grouping pertains to payroll processing or to employee benefits calculations.

The second example method 220 may further include monitoring changes to be made or that have been made or that are being made to a core software application (included among the one or more software applications) with reference to the customized computing objects and custom object groupings, and generating a signal to alert a customer of the software application when a change to the software application is estimated to impact behavior of one or more of the customized computing objects. The signal may include or be represented via an email message indicating one or more impacted customized objects that will be impacted by a change slated for the software application. The email message may include a version of a custom object impact report, an example of which is illustrated via the UI display screen 72 of FIG. 5.

The second example method 220 may further include generating ongoing or periodic comparisons between metadata characterizing a first customer software application; information characterizing ongoing maintenance of the software application; and information characterizing currently available upgrades of the software application. The metadata may include one or more custom object groupings that are grouped in accordance with one or more business requirements and that characterize one or more customizations made to the first customer software application.

The second example method 220 may further include providing a UI display screen with one or more UI controls for viewing information pertaining to results of the comparisons, and recording results of customer decisions (e.g., as shown in the decision column 172 of FIG. 5) made responsive to user interaction with a UI display screen generated by a software analysis tool.

Customization information pertaining to a first customer may be delivered to one or more developer systems used to develop the software application to be modified or upgraded. For example, one of the client systems 12 of FIG. 1 may represent a developer system, and the developer may log into the server-side analysis tool 30 to view various customizations made by various customers. This enables developers to focus on changes to core software in future upgrade releases that may reduce the need for customer-made customizations to delivered core software application(s).

Although the description has been described with respect to particular embodiments thereof, these particular embodiments are merely illustrative, and not restrictive. For example, while various embodiments are discussed herein with reference to networked enterprise computing environments, embodiments are not limited thereto. For example, embodiments discussed herein may be adapted for various client-side implementations or networked applications of virtually any software that includes customized components to be inventoried and analyzed before an upgrade or change to the core software.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible or non-transitory processor-readable storage device or media suitable for storing instructions executable by one or more digital processors.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:
1. A method for analyzing customized computing objects, the method comprising:
 initiating discovery code configured to search a first computing environment to identify one or more customized computing objects of one or more software applications of the first computing environment, resulting in discovery data identifying one or more custom objects associated with the one or more software applications configured in a first operational state;

receiving, at a second computing environment, the discovery data associated with the first computing environment and other discovery data associated with at least one other computing environment running one or more other software applications corresponding to the one or more software applications;

compiling metadata characterizing the one or more customized computing objects at the first operational state, wherein the metadata includes the discovery data;

in response to user input pertaining to the metadata, determining one or more grouping criteria for grouping the identified one or more custom objects;

receiving, at the second computing environment, one or more changes to apply to the one or more software applications, which, when applied to the one or more software applications, results in a second operational state of the one or more software applications relative to the first operational state;

storing, at the second computing environment, change data characterizing the one or more changes to apply to the one or more software applications;

analyzing, at the second computing environment, the metadata to establish benchmarks of operation of the one or more software applications in the first operational state;

selectively grouping the one or more customized computing objects based on the one or more grouping criteria, resulting in one or more custom object groupings, wherein at least one of the one or more custom object groupings comprises a particular custom object grouping of particular customized computing objects that, functioning together, provide a particular type of functionality that is not provided by individual computing objects of the one or more software applications of the computing environment;

generating a relative complexity score for each of the one or more custom object groupings indicating ranking of the discovery data relative to the other discovery data by comparing the benchmarks to a benchmarking database characterizing the other discovery data, each complexity score characterizing a measurement of customization complexity for a respective one of the one or more custom object groupings;

while maintaining the first operational state of the one or more software applications, anticipating behavior of the one or more customized computing objects in a second operational state of the one or more software applications prior to establishing the second operational state of the one or more software applications by analyzing the discovery data with respect to the change data and characterizing one or more changes to be made to the one or more software applications, including changes to non-customized computing objects of the one or more software applications in the first operational state, the one or more changes to provide the second operational state;

based at least in part on the generated complexity scores, rendering one or more user interface display screens indicating one or more impacts that a change to one or more particular non-customized computing objects would incur on one or more of the particular customized computing objects upon application of the one or more changes to the one or more software applications resulting in the second operational state of the one or more software applications reflecting at least some code violations comprising at least some interactions among components of a software system, at least one of the one or more user interface display screens including a description of one or more projected impacts to result from the one or more changes.

2. The method of claim 1, wherein the change data includes data maintained in a maintenance event repository.

3. The method of claim 2, wherein the change data includes data maintained in an upgrade event repository.

4. The method of claim 1, wherein the one or more software applications include one or more enterprise software applications.

5. The method of claim 4, wherein the first computing environment includes an enterprise computing environment.

6. The method of claim 1, wherein at least one of the one or more user interface display screens includes a report comprising the generated relative complexity score for each of the one or more custom object groupings, each complexity score indicating a first degree of customization of a software application of the one or more software applications relative to a second degree of customization of one or more other customer implementations of the software application.

7. The method of claim 6, wherein the complexity score indicates a degree of customization relative to customizations implemented by other customers.

8. The method of claim 6, further including:
providing, in the report, a user interface control that is responsive to user interaction to trigger display of information resulting from a comparison of one or more customizations in the one or more customized computing objects with a feature of the software application slated to be part of a future upgrade of the software application.

9. The method of claim 1, wherein the determining the one or more grouping criteria for grouping the identified one or more custom objects further includes receiving a signal responsive to user interaction with a first user interface control, the signal indicating user-specified characteristics for a particular custom object grouping.

10. The method of claim 1, further including:
generating a signal to alert a customer when a change to the one or more software applications is estimated by software to impact the behavior of one or more of the customized computing objects.

11. A non-transitory processor-readable storage device including instructions executable by a digital processor, the processor-readable storage device including one or more instructions for:

initiating discovery code configured to search a first computing environment to identify one or more customized computing objects of one or more software applications of the first computing environment, resulting in discovery data identifying one or more custom objects associated with the one or more software applications configured in a first operational state;

receiving, at a second computing environment, the discovery data associated with the first computing environment and other discovery data associated with at least one other computing environment running one or more other software applications corresponding to the one or more software applications;

compiling metadata characterizing the one or more customized computing objects at the first operational state, wherein the metadata includes the discovery data;

in response to user input pertaining to the metadata, determining one or more grouping criteria for grouping the one or more identified custom objects;

receiving, at the second computing environment, one or more changes to apply to the one or more software applications, which, when applied to the one or more software applications, results in a second operational state of the one or more software applications relative to the first operational state;

storing, at the second computing environment, change data characterizing the one or more changes to apply to the one or more software applications;

analyzing, at the second computing environment, the metadata to establish benchmarks of operation of the one or more software applications in the first operational state;

selectively grouping the one or more customized computing objects based on the one or more grouping criteria, resulting in one or more custom object groupings, wherein at least one of the one or more custom object groupings comprises a particular custom object grouping of particular customized computing objects that, functioning together, provide a particular type of functionality that is not provided by individual computing objects of the one or more software applications of the computing environment;

generating a relative complexity score for each of the one or more custom object groupings indicating ranking of the discovery data relative to the other discovery data by comparing the benchmarks to a benchmarking database characterizing the other discovery data, each complexity score characterizing a measurement of customization complexity for a respective one of the one or more custom object groupings;

while maintaining the first operational state of the one or more software applications, anticipating behavior of the one or more customized computing objects in a second operational state of the one or more software applications prior to establishing the second operational state of the one or more software applications by analyzing the discovery data with respect to the change data and characterizing one or more changes to be made to the one or more software applications, including changes to non-customized computing objects of the one or more software applications in the first operational state, the one or more changes to provide the second operational state;

based at least in part on the generated complexity scores, rendering one or more user interface display screens indicating one or more impacts that a change to one or more particular non-customized computing objects would incur on one or more of the particular customized computing objects upon application of the one or more changes to the one or more software applications resulting in the second operational state of the one or more software applications reflecting at least some code violations comprising at least some interactions among components of a software system, at least one of the one or more user interface display screens including a description of one or more projected impacts to result from the one or more changes.

12. The non-transitory processor-readable storage device of claim 11, wherein the change data includes data maintained in a maintenance event repository.

13. The non-transitory processor-readable storage device of claim 12, wherein the change data includes data maintained in an upgrade event repository.

14. The non-transitory processor-readable storage device of claim 11, wherein the one or more software applications include one or more enterprise software applications.

15. The non-transitory processor-readable storage device of claim 14, wherein the first computing environment includes an enterprise computing environment.

16. The non-transitory processor-readable storage device of claim 11, wherein at least one of the one or more user interface display screens includes a report comprising the generated relative complexity score for each of the one or more custom object groupings, each complexity score indicating a first degree of customization of a software application of the one or more software applications relative to a second degree of customization of one or more other customer implementations of the software application.

17. The non-transitory processor-readable storage device of claim 16, wherein the complexity score indicates a degree of customization relative to customizations implemented by other customers using similar or different platforms.

18. The non-transitory processor-readable storage device of claim 16, further including:
providing, in the report, a user interface control that is responsive to user interaction to trigger display of information resulting from a comparison of one or more customizations in the one or more customized computing objects with a feature of the software application slated to be part of a future upgrade of the software application.

19. The non-transitory processor-readable storage device of claim 11, wherein the determining the one or more grouping criteria for grouping the identified one or more custom objects further includes receiving a signal responsive to user interaction with a first user interface control, the signal indicating user-specified characteristics for a particular custom object grouping.

20. The non-transitory processor-readable storage device of claim 11, further including:
generating a signal to alert a customer when a change to the one or more software applications is estimated by software to impact the behavior of one or more of the customized computing objects.

* * * * *